United States Patent [19]
Coaker et al.

[11] Patent Number: 5,170,583
[45] Date of Patent: Dec. 15, 1992

[54] DEVICE FOR ATTRACTING MOTHS

[75] Inventors: Thomas H. Coaker; George Quartey, both of Cambridge; Owen T. Jones, Wales, all of United Kingdom

[73] Assignee: Agrisense - BCS Limited, Wales, United Kingdom

[21] Appl. No.: 754,837

[22] Filed: Sep. 4, 1991

[30] Foreign Application Priority Data

Sep. 13, 1990 [GB] United Kingdom ................ 9020059

[51] Int. Cl.$^5$ .............................................. A01M 1/20
[52] U.S. Cl. ...................................................... 43/107
[58] Field of Search ................ 43/107, 114, 113, 115, 43/122, 116, 117, 118, 119

[56] References Cited

U.S. PATENT DOCUMENTS

| 466,637 | 1/1892 | Thum | 43/114 |
| 1,120,046 | 12/1914 | Fritsch | 43/119 |
| 1,655,128 | 1/1928 | Berghorn | 43/114 |
| 2,097,924 | 11/1937 | Kell | 43/114 |
| 4,058,462 | 11/1977 | Fein et al. | 210/289 |
| 4,671,010 | 6/1987 | Conlee et al. | 43/114 |

FOREIGN PATENT DOCUMENTS 0001297 of 1912 United Kingdom ................ 43/116

Primary Examiner—Richard K. Seidel
Assistant Examiner—James Miner
Attorney, Agent, or Firm—Robert L. McKellar

[57] ABSTRACT

Device for attracting moths, for example *Ephestia cautella*, which comprises at least one external surface exhibiting light and dark stripes which are vertical when the device is disposed for use, there being present on or in the device a substance e.g. a pheromone which is an attractant for moths.

9 Claims, 2 Drawing Sheets

DEVICE FOR ATTRACTING MOTHS

This invention is concerned with a device for attracting moths.

As the world's population grows methods for increasing the food supply has become an important subject for study. One element in such study is the prevention of post harvest losses resulting from the activities of insects and other pests during storage of the foodstuffs. In addition to rendering the food unavailable in times of shortage the activities of such pests result in economic loss associated with the presence of contaminants such as live and dead insects. The tropical warehouse moth *Ephestia Cautella* is a serious pest of stored products, for example dried fruit and grain, throughout the World.

It is known to provide traps for the monitoring, study and control of flying insects. Such traps are of various designs and may be for example, tent shaped, plain strips of card and the like and cylinders which are closed at their lower end and have at their upper end a funnel shaped entrance area which permits entry of the insect into the volume enclosed by the cylinder but prevents their escape therefrom. An attractant source such as food or a pheromone may be placed in the trap to attract the insect. Traps of the kind described have been used, for example, to catch moths for counting as part of statistical surveys. However, the effectiveness of these traps has been found to be comparatively low and it has been desired to improve their effect so as to increase the proportion of a moth population which can be trapped. The efficiency of the traps has been such that it is not generally contemplated to use the traps for controlling the population of moths to any significant extent.

We have now found that traps having increased attraction and efficiency with respect to certain species of moth can be obtained if there is provided on the visible surfaces of said traps a pattern of vertical dark stripes on a light background. When loaded with appropriate lures they can be used as traps for statistical population monitoring purposes or as lure and kill devices for the control of moth populations.

Accordingly this invention provides a device for attracting moths comprising at least one external surface having thereon a plurality of light and dark stripes arranged such that when the device is disposed for use the stripes are substantially vertical, there being present in or on the device a substance which is an attractant for moths.

In a device according to the invention at least one visible external surface has a pattern thereon which consists of at least two dark stripes on a light background. It is believed that the improved efficiency of the device is the result of visual attraction of the moth to the zone of contrast between the light and dark areas. In order to achieve the highest degree of contrast the light background is preferably white in colour and the dark stripes are black, brown or red. The width of the light and/or dark stripes preferably lies within the range from about 5 mm to 20 mm. When the trap is designed for the monitoring and/or control of *Ephestia Cautella* optimum efficiency is obtained when the stripes each have a width of about 7.5 mm, generally from 6 to 9 mm.

Devices according to the invention may take various forms. For example, they may be designed to function as a trap for collecting and counting moths for monitoring purposes. Alternatively they may take the form of a lure and kill device for the purpose of control and eradication. Thus, the device may be simply a strip of material such as cardboard which has thereon the striped pattern together with the attractant, for example food and/or a pheromone. Preferably the attractant is a pheromone which is attractive to at least one gender of the species of moth in respect of which the device is intended for use. When the moth is *Ephestia Cautella* or *Plodia Interpunctella* the pheromone may be (Z,E)-9,12-tetradecadienyl acetate (TDA) with or without minor amounts of (Z)-9-tetradecenyl acetate (TA) and (Z,E)-9,12-tetradecadienol. The strip device may be coated with an adhesive for trapping the attracted and alighting moths or may be coated or impregnated with an appropriate insecticide, for example 2,2-dichlorovinyl dimethyl phosphate.

In another form the device may comprise one or more chambers each of which has an opening sufficiently large to permit a moth to enter the chamber and sufficiently small to prevent the escape of the moth thereby from within the chamber. The opening may take the form of a single aperture or plurality of apertures, such as slots, in the wall of the chamber but more preferably is defined by the lower aperture of a funnel which narrows towards the interior or floor of the chamber. In such an embodiment the funnel may be enclosed within the chamber or may project from the roof or wall thereof. The attractant may be present in the chamber or at the entrance to the chamber. For example, it may be placed on a tray or other like carrier within the chamber or, if rendered in liquid form, may be employed to impregnate the interior surface of the chamber. In view of their volatiliy it is generally preferred to control the rate of release of pheromone attractants by dispensing from a wick or other type of porous substrate, for example a natural rubber septum, a polyethylene capsule or hollow fibres. The chamber, and the device containing and/or defining said chamber, may be cuboidal or of any other suitable geometrical configuration. A preferred construction of moth trap according to the invention is in the form of a cylinder within which the chamber is defined and which has the pattern of parallel light and dark stripes on its outer surface arranged in such a way that when the trap is disposed for use, for example by suspension in a desired location, the stripes are disposed vertically. The cylinder may have a closed base end and an opening through which a moth may pass into a funnel which narrows towards the interior of the chamber and has an opening sufficiently large to permit a moth to pass through to enter the chamber and sufficiently small to ensure the moth cannot escape from within the chamber. If desired two or more traps may be arranged in series. According to a further modification instead of a closed base end the cylinder may lead into a demountable second chamber in which the moths are retained and which may be detached and disposed of when full. The dimensions of the device are chosen to be appropriate having regard to such considerations as the average size of the moth, the space available for mounting the trap at the desired location and the rapidity with which the chamber becomes filled with the trapped moths. It is believed that the dimensions of the striped pattern can be relevant to its degree of attraction to the moth. With respect to devices of cylindrical configuration it is preferred that they have a length of from about 15 to 70 cm and a diameter of from 6 to 12 cm. The required length may be obtained, if desired, by disposing two or more devices in series.

There now follows a description, to be read with reference to the accompanying drawings, of devices according to the invention which illustrate three embodiments of the invention by way of example.

Figure 1:
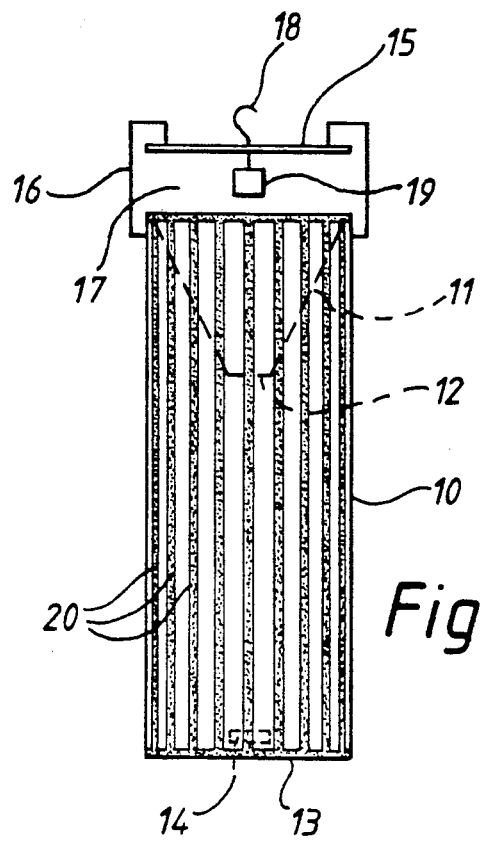
FIG. 1 is a side view of a single unit trap, according to the invention.

In FIG. 1 a cylindrical chamber (10) is fitted internally at its upper end with a funnel (11) having an aperture (12) at its narrow end which is small enough to prevent the escape of moths trapped in the chamber below. The cylinder is closed at its lower end (13) and contains an insecticide (14) which may be omitted when the trap is intended for capture of live specimens and not as a lure and kill device. A cover (15) is positioned above the upper open end of the chamber and held in place by a wire connector (16), the gap (17) between the cover and cylinder being large enough to allow the entry of moths. Passing through the centre of the cover (15) is a wire hook (18) for suspending the trap and attaching a lure (19) below the cover. The external surface of the cylindrical chamber has thereon a pattern of dark stripes (20), preferably black, brown or red stripes on a white background.

The cylindrical chamber (10) is preferably from 15 to 50 cm long and has a diameter of from 6 to 12 cm. The light and dark stripes preferably have a width within the range from about 6 mm to 9 mm.

Figure 2:
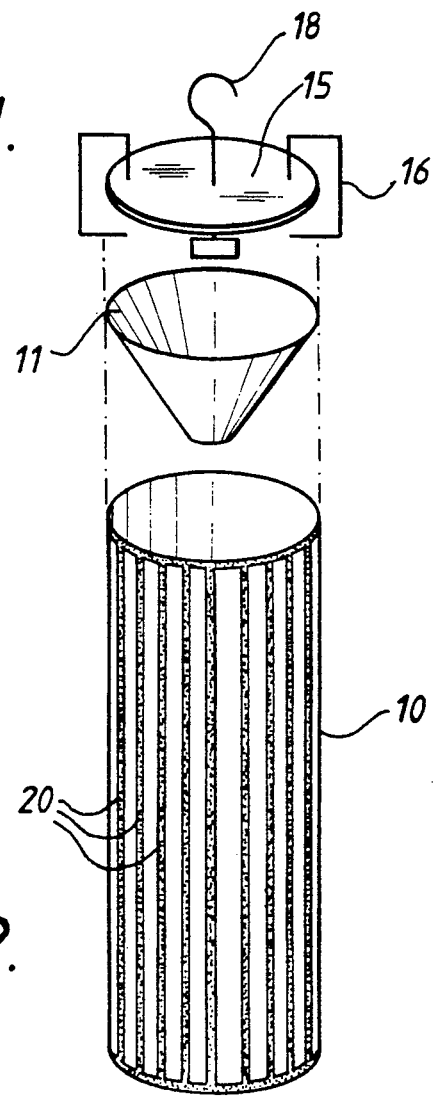
FIG. 2 is an exploded view of the trap shown in FIG. 1.

FIG. 2 is an exploded view of the device of FIG. 1 and shows the funnel (11), lid (15) and attachments (16) and (18) in more detail.

Figure 3:
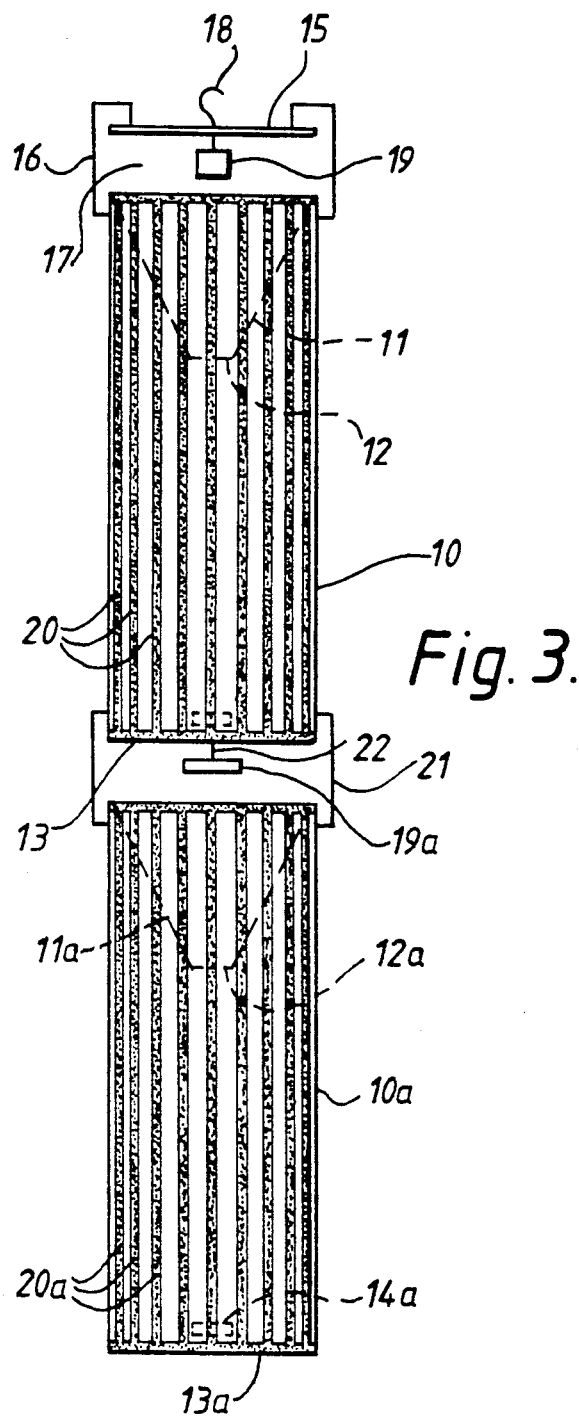
FIG. 3 is a view of a trap consisting of two single units placed in series.

In FIG. 3 there is shown a device wherein two units of the type represented in FIG. 1 are employed in series. The lower unit (10a) is constructed similarly to the upper unit (10) except that the cover (15) and suspension hook (18) are omitted. The lower unit (10a) is attached to the upper unit (10) by means of a simple wire connector (21) and the vertical spacing of the units is sufficient to permit entry by moths. A wire carrier (22) is provided from the base of the upper unit for suspending the attractant or lure (19a) just above the open end of the lower unit.

Experimental data indicates that the length of the trap (2 units) provides the optimum visual stimulus to the moths and two pheromone lures (2×1 mg, TDA:-TA=2:1) the optimum olfactory attractive stimulus. Moths moving towards the trap either enter the units directly, or after alighting on them, move upwards towards the lures (19, 19a) and enter either unit. The relative efficiency of the trap in still air is 75% and in moving air (0.6 m/s) 90% compared with 40% and 50% respectively for a similar trap having a plain non-striped outer surface.

Figure 4:
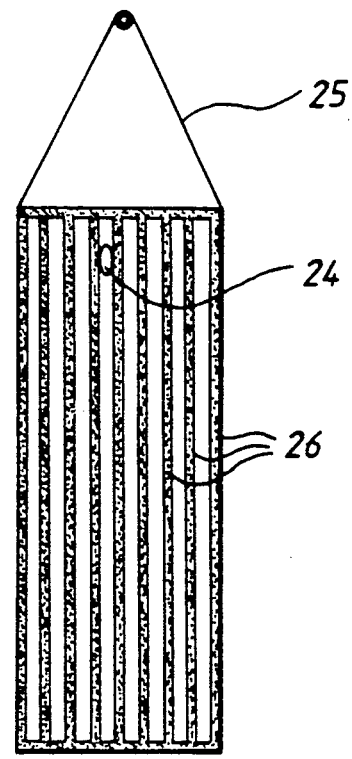
FIG. 4 is a view of a lure and kill board.

The third illustrative device is a lure and kill board as shown in FIG. 4. The board has dimensions 50 cm × 6 to 12 cm and has 7.55 mm wide black (26) and white stripes as used in the first illustrative device arranged parallel to the longest side and is designed to be suspended with its stripes vertically disposed by means of a wire or cord (25) or by any other appropriate suspension means, for example a hole pierced in the board itself. The board has an insecticide treated surface to kill alighting moths and has a lure (24) (food or pheromone) to attract them. The board may be made of any material such as wood, cardboard or man-made or natural fibres. In a modified form of such a device the board is curled to a cylindrical configuration on which the stripes are disposed parallel to the axis of the cylinder and which is intended for disposition with its axis vertical. Suitably the cylinder has a length of 50 cm and a diameter of 6 to 12 cm. The external surface of this cylinder has the same features as those of the board.

We claim:

1. A device for attracting moths comprising at least one external surface which is visible and has thereon a pattern of vertical dark stripes on a light background, the stripes arranged such that when the device is disposed for use the stripes are substantially vertical, there being present in or on the device a substance which is a pheromone attractant for moths.

2. A device as claimed in claim 1 wherein the dark stripes are of a color selected from black, brown and red.

3. A device as claimed in claim 1 or claim 2 wherein at least some of the stripes have a width which lies within the range from 5 mm to 20 mm.

4. A device as claimed in claim 1 wherein the pheromone is attractive to at least one gender of the moth *Ephestia Cautella*.

5. A device as claimed in claim 1 which has thereon or therein an insecticide.

6. A device as claimed in claim 1 comprising a chamber having an opening sufficiently large to permit a moth to pass through and enter the chamber and sufficiently small to prevent the escape of the moth thereby from within the chamber.

7. A device as claimed in claim 6 wherein the chamber has a closed end and at least one opening to a funnel which narrows in the direction of the closed end to define an opening which is sufficiently large to permit a moth to pass through to enter the chamber and sufficiently small to prevent the escape of the moth thereby from within the chamber.

8. A device as claimed in claim 6 in the form of a cylinder within which the chamber is defined.

9. A device as claimed in claim 8 comprising at least two cylinders disposed in series.

* * * * *